United States Patent
van der Griendt

[11] Patent Number: 5,454,355
[45] Date of Patent: Oct. 3, 1995

[54] ENGINE OIL INLET ADAPTER

[75] Inventor: Adrianus J. van der Griendt, Bloomfield Hills, Mich.

[73] Assignee: K.J. Manufacturing Company, Wixom, Mich.

[21] Appl. No.: 252,621

[22] Filed: Jun. 1, 1994

[51] Int. Cl.⁶ .................................................. F16C 3/14
[52] U.S. Cl. .................................. 123/196 A; 184/1.5
[58] Field of Search .................... 123/196 R, 196 S, 123/196 A; 184/1.5

[56] References Cited

U.S. PATENT DOCUMENTS

| | | | |
|---|---|---|---|
| 4,452,695 | 6/1984 | Schmidt | 123/196 A |
| 4,479,468 | 10/1984 | Norwood, Sr. | 123/196 A |
| 4,672,932 | 6/1987 | Schmidt | 123/196 A |
| 4,940,209 | 7/1990 | Fish . | |
| 5,044,334 | 9/1991 | Bedi . | |
| 5,048,578 | 9/1991 | Dorf et al. . | |
| 5,090,376 | 2/1992 | Bedi . | |
| 5,094,201 | 3/1992 | Bedi . | |
| 5,209,198 | 5/1993 | Bedi . | |
| 5,246,086 | 9/1993 | Yunick | 123/196 A |
| 5,327,862 | 7/1994 | Bedi | 184/1.5 |

FOREIGN PATENT DOCUMENTS 3610421  10/1987  Germany ........................... 184/1.5

*Primary Examiner*—Henry C. Yuen
*Assistant Examiner*—Erick Solis
*Attorney, Agent, or Firm*—Basile and Hanlon

[57] ABSTRACT

An oil inlet adapter assembly connectible to an oil inlet channel or gallery leading to at least one oil filter for an internal combustion engine. The oil inlet adapter assembly comprises an inlet fitting, a nipple extension, and a quick connect nipple connected in series. The inlet fitting is a compact fitting having a threaded portion and a flanged portion. A first bore is drilled through the interior of the threaded portion, and another bore is drilled through one of the hexagonal sides to meet the first bore to form a through bore in the inlet fitting having an essentially 90° angle.

12 Claims, 2 Drawing Sheets

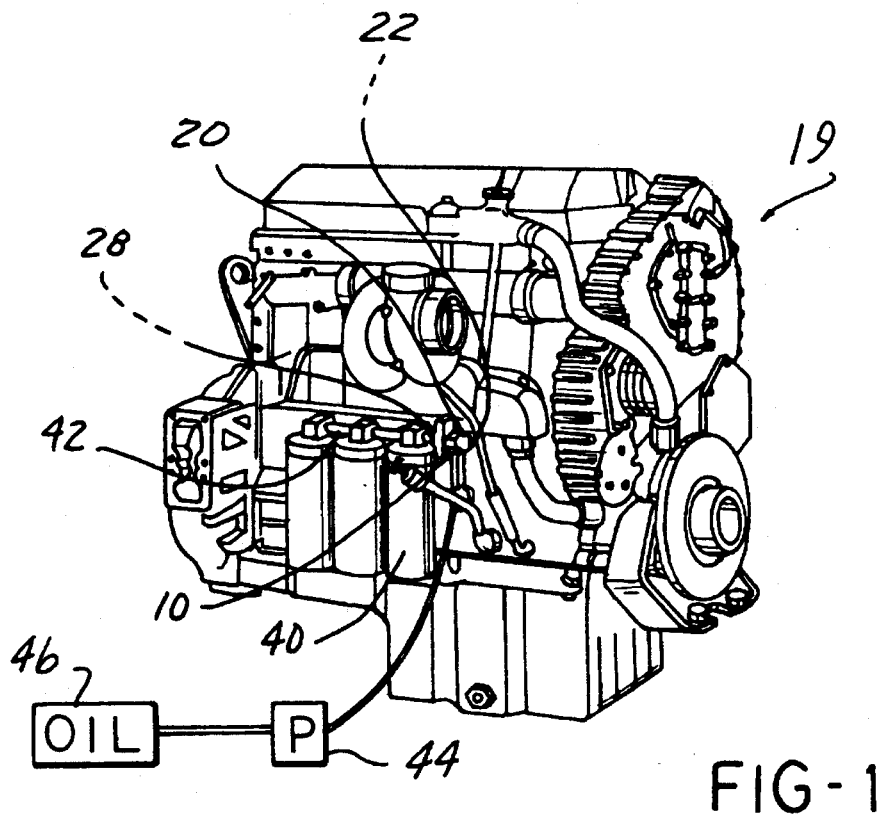
FIG-1
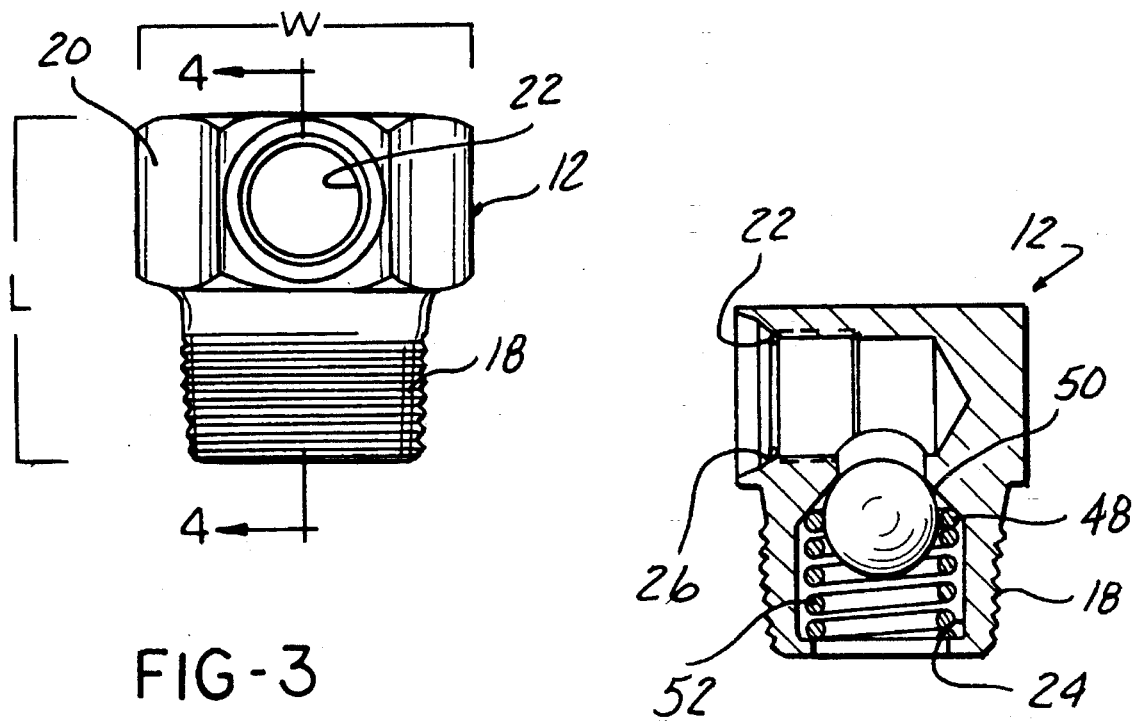
FIG-3
FIG-4

ENGINE OIL INLET ADAPTER

FIELD OF THE INVENTION

This invention relates to a device for an internal combustion engine providing easy access to a common oil inlet gallery to the oil filters to refill the lubrication system of the engine through the oil filter and lubrication passages with fresh motor oil.

BACKGROUND OF THE INVENTION

The benefits of routine oil changes in an internal combustion engine are well known. Routine oil changes have been shown to increase engine life and performance. With repeated prolonged use, motor oil builds up suspended particles, metallic and non-metallic, from the abrasive and adhesive wear of engine parts against one another and from products of incomplete combustion and improper air intake. The particles, in turn, cause abrasive wear of the engine bearings, piston rings and other moving parts and the reduction of the motor oil lubricity as various additives and lubricating components become depleted. This adversely effects engine performance and if left unchanged, can destroy or cripple the engine performance.

To obtain satisfactory engine performance, changing the motor oil in an internal combustion engine is a necessary, but an undesirable, dirty and time consuming task. In currently designed vehicle, the oil pan serves the purpose of a reservoir for circulation of engine oil. Engine lubrication is generally accomplished through a gear type pump. The pump picks up engine oil from the oil pan sump, where oil is drawn up through the pick-up screen and tube and passed through the pump to the oil filter, before going to the engine oil galleries. In the filter, the oil passes through a filtering element where dirt and foreign particles are removed.

To remove the contaminated oil, the drain plug generally located in the lower most region of the oil pan is opened. Spent oil containing suspended particles is permitted to flow under gravity out of the pan into a suitable receptacle. After the spent oil is removed, the plug is replaced and fresh oil is added to the engine usually through a separate opening in the engine valve cover. The process of gravity drainage does not remove all of the spent oil, with its metallic and non-metallic particles, which stick to the internal oil passages.

It is regular practice to change the oil filter when the oil is changed, so that most of the dirt and foreign particles are removed with the old oil filter. Unfortunately, after an engine's oil and filter have been changed, the engine usually is only slightly lubricated because the oil changing process results in most of the new oil being located in the sump of the engine. As a result, a time span occurs where the engine is without proper lubrication, therefore, it is desirable to provide an oil inlet access means to the oil filter directly so that all fluid introduced into the internal combustion engine first flows through the oil filter element of the internal combustion engine and then passes through the lubrication passages within the internal combustion engine prior to accumulating within the oil pan reservoir of the internal combustion engine. This provides expedient and efficient means for purging fluid from the oil filter element, flushing contaminants from the internal passages of the lubrication system during a flushing cycle and prelubricating the lubrication system of internal passages within the internal combustion engine and recharging the oil filter with fresh oil during the fresh oil introduction phase. It is specifically desirable to provide an oil inlet access means to a main channel feeding to multiple oil filters of an internal combustion engine, wherein the access is located in a confined location having minimal surrounding space to mount the oil inlet access means.

SUMMARY OF THE INVENTION

The present invention is an apparatus for retrofitting a vehicle to facilitate oil introduction into the oil filter for an internal combustion engine. The apparatus is especially beneficial for engines having multiple oil filters in parallel and having limited access clearance surrounding the engine. The apparatus is an engine oil inlet adapter that is external and separable from the internal combustion engine. The adapter is insertable at a selected existing engine opening to facilitate oil introduction into the oil filter.

The apparatus of the present invention comprises an inlet adapter assembly having an inlet fitting, a nipple extension and a quick connect nipple. The inlet adapter assembly is threadably insertable into an inlet boss accessible to a main channel fitting to one or more oil filters of the internal combustion engine. The inlet adapter assembly is especially beneficial for confined areas around the engine compartment that cannot accommodate an elbow adapter for angular orientation of a fluid coupling assembly. An example of an engine having an oil access boss located in a limited accessible region is the Detroit Diesel Series 60 Engine.

The inlet fitting has an externally threaded male end for mating with the internally threaded inlet boss on the engine. At a distal end, the inlet fitting has a flanged portion adapted to be engaged for known tools for turning the inlet fitting in engagement with the threaded inlet boss. Through one side of the flanged portion is an internally threaded aperture in communication with an aperture extending from the externally threaded male end of the inlet fitting.

The nipple extension is a tubular construction having externally threaded male ends at either end. One end is adaptable to threadably mate with the internally threaded aperture of the flanged portion of the inlet fitting. The distal end of the nipple extension is adaptable for engagement with a quick connect nipple. The nipple extension can be any length to facilitate access to the quick connect nipple.

The quick connect nipple is adaptable for communication with a pump means engageable with a fresh oil supply for creating a pressure with the supply, thereby drawing oil from the supply through the inlet fitting assembly to the main feed channel to the oil filters.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is an internal combustion engine having a inlet adapter assembly mounted to an inlet to the main channel to oil filters of said engine.

FIG. 3 is a view of the inlet fitting showing an aperture through a hexagonal portion of said inlet fitting.

FIG. 4 is a cross sectional view of the inlet fitting taken along lines 4—4 of FIG. 3.

DESCRIPTION OF THE PREFERRED EMBODIMENT

Figure 2:
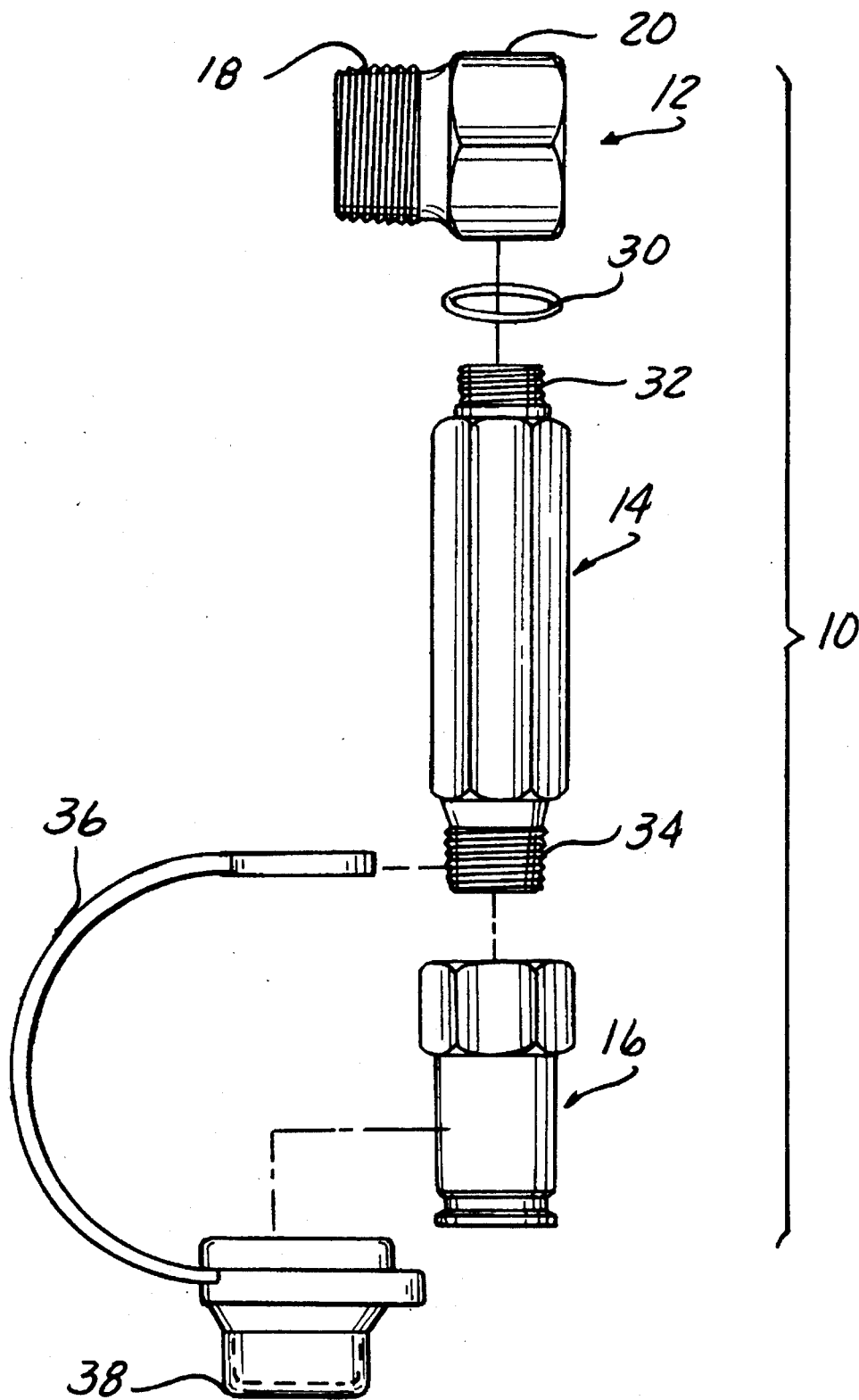
FIG. 2 is an exploded view of components of the inlet adapter assembly.

The basic apparatus of the present invention can be employed successfully with vehicles or stationary power plants having internal combustion engines which have internal lube oil distribution passage systems. The term "internal oil lube distribution passage system" is defined as, but not limited to, the machine passages a recirculation systems present in the engine block, cylinder head, crankshaft, camshaft and connecting rods. Various engines will have differing lubrication requirements. Additionally, certain vehicles can include oil cooling systems in which residual oil can remain; therefore, it is understood that every engine may not have passages or circulation systems in all the enumerated components.

The apparatus of the present invention is an inlet adapter assembly 10 composed of an inlet fitting 12 attached in a series to a nipple extension 14 and a quick connect nipple 16. The inlet fitting 12 has a configuration of a bolt. One end 18 of the inlet fitting has an externally threaded region adapted for threadably securing to an inlet access boss 28 of the engine 19. The threading engagement ultimately achieved can be either permanent or semi-permanent in nature. However, it is preferred that a suitable thread sealant be employed to insure that the engagement between the two matingly threaded surfaces is sufficiently secured to prevent leaking of the inlet adapter 10 during engine operation or during introduction of oil during oil change operations. At a distal end of the threaded region is a hexagonal flange 20 extending outwardly from the threaded region. Although the preferred embodiment uses a hexagonal flange, the flange 20 may be any convenient shape that has a sufficient width and depth to accommodate a standard hexdriver or other appropriate removal tool. The hexagonal flange 20 also has a sufficient width and depth to accommodate a bore 22 drilled into one side of the hexagonal flange 20 through to the center of the inlet fitting. Bore 22 has an internally threaded region 26 for mating to the nipple extension 14. A central bore 24 extends internally through the inlet fitting from the threaded region 18 to meet bore 22 in the hexagonal flange 20. The resultant through bore through the inlet fitting 12 results in an angle essentially equal to 90°. This angle orientation provides access to the oil access boss 28, where available area is limited for threading an inlet adapter of other configurations into the oil access boss, as seen in FIG. 1. In the preferred embodiment, the inlet fitting is capable of being inserted into the inlet access boss 28 of the engine 19 where minimal surrounding engine space is available. The inlet fitting 12 has a length (L) of approximately 1.5 inches and a width (W) at the hexagonal flange of approximately 1.25 inches, allowing the fitting 12 to be inserted in confined locations slightly larger than the aforementioned dimensions. Other similar dimensions of the inlet fitting 12 would be within the scope of the invention. In an engine configuration shown but not limited to that in FIG. 1, most available elbow fittings would not be accommodated in the limited space without a significant reduction of the flow rate of the fresh oil into the engine, and thereby a less than desirable flow rate.

The threaded bore 22 of the hexagonal flange 20 is adapted for receiving a nipple extension 14. The nipple 14 is preferably a hollow cylindrical tube having a pair of opposing ends with exterior threaded regions located adjacent thereto. The nipple 14 is of sufficient length to facilitate access when introducing oil into the engine. The nipple extension 14 includes suitable means for sealing and connecting the nipple extension 14 to the inlet fitting 12. The sealing means can include a suitable 0-ring 30 or gasket disposed between the nipple extension 14 and the inlet fitting 12. The first threaded region 32 of the nipple extension is adapted to be threadingly inserted into a mating threaded opening of the bore 22 in the hexagonal flange 20 of the inlet fitting 12. Threaded region 34 of the nipple extension 14 is adapted to be threadingly inserted into a mating threaded opening of a conventional quick connect nipple 16.

The inlet adapter assembly 10 includes means for protecting the quick connect nipple 16 from abrasion, dirt or other contamination or degradation which would impair the ability of the nipple 16 to form a mating connection with an external fluid supply hose when necessary. The protection means 36 is one which ideally would remain in place during routine engine operation and would provide ready access to the quick connect nipple 16 when an oil change is required. In the preferred embodiment of this invention, the protection means 36 is a removable dust cap 38 having a hollow interior into which the outlet end of the quick connect nipple 16 can be inserted. The dust cover 38 is configured to permit sufficiently secure contact between the dust cap 38 and the quick connect nipple 16 so that accidental disengagement of the dust cap 38 during normal engine operation is prevented. The means of engagement between the dust cap 38 and quick connect nipple 16 may be suitably means, such as mechanical, frictional or combination thereof.

The nipple extension 14 and the quick connect nipple 16, in combination, provide an inlet subassembly. The inlet subassembly is connected after the inlet fitting 12 is installed. The inlet fitting 12 is threaded into the bore of the oil access boss 28. The fitting 12 requires minimal space for insertion because there are no elbow extensions to come into contact with engine components during the threading process. Threading of the inlet fitting 12 is continued until it is secured within said boss 28 and so that the bore 22 of the hexagonal flange 20 is exposed and easily accessible for insertion of the inlet subassembly. As shown in FIG. 1, the bore 22 of the hexagonal flange 20 is positioned downwardly so that the inlet subassembly is placed parallel to an adjacent oil filter 40. The direction of the bore 22 of the hexagonal flange 20 is dependent upon available space within the engine compartment and accessibility to the oil filter gallery.

After waste oil has been removed from the engine and oil pan by conventional means or as discussed in Ser. No. 08/199,476, air purging and flushing of the oil filters and oil passages can be accomplished through the inlet adapter assembly 10. Fresh engine lube oil can then be added to the oil filter units through the inlet adapter assembly. A pumping means 44 connected to a fresh oil supply 46 at one end and to the quick connect nipple 16 at another end pumps the fresh oil through the quick connect nipple 16, extension nipple 14, inlet fitting 12 and ultimately to the main inlet channels 42 to the oil filters 40, in the direction of normal lube oil flow. To maintain one-way direction of fluid flow, a conventional one-way check valve 48 comprising a ball 50 and spring 52 assembly is inserted in the central bore 24 of the inlet fitting 12.

The amount of fresh oil added through the engine oil filter 40 will vary from vehicle to vehicle, as well as from process application to process application. Thus, the amount of oil introduced may be an amount sufficient to replace all spent engine oil or may as little as the amount to prime the oil filter 40. In either situation, addition of fresh oil through the engine oil filter 40 permits entry of a portion of oil into the internal engine oil passages, thereby prelubricating the various engine components, as well as providing a full oil filter at the time of engine startup. This feature eliminates the momentary starvation of lubricating oil experienced in conventional procedures in which the lube oil must first fill the empty filter and oil passages before it reaches the various lubricating points.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An oil inlet adapter located on an internal combustion engine having a lubrication passage system with at least one oil filter and an oil reservoir, an oil inlet passage supplying oil to said at least one oil filter and located in an area on the engine having minimal surrounding space, said oil inlet adapter comprising:

an oil inlet fitting having an outlet connectible to said oil inlet passage and having a single connecting passage between said outlet and an inlet;

an oil conveying means having a first end connected to said inlet of said oil inlet fitting and a second end; and a quick connect nipple member attached to said oil conveying means and releasably attachable to a pump for an external oil supply source.

2. The oil inlet adapter of claim 1 further including a means for maintaining oil flow in only one direction.

3. The oil inlet fitting of claim 1 wherein said fitting has an externally threaded outlet for threadably mating to the inlet and an internally threaded inlet for connecting to the oil conveying means and said connecting passage having essentially a 90° angle therebetween.

4. The oil inlet fitting of claim 3 wherein said internally threaded inlet has an annular flange on the outer surface, to facilitate easy removal.

5. The oil inlet fitting of claim 3 wherein said fitting has a length and width less than two inches.

6. The oil inlet fitting of claim 3 wherein said fitting has a length of approximately 1.5 inches.

7. The oil inlet fitting of claim 4 wherein said internally threaded inlet is located in one side of the annular flange.

8. The oil inlet adapter of claim 1 wherein said oil conveying means comprises an extension nipple having a central inner bore providing an oil entry opening proximate to the inlet.

9. The oil inlet fitting of claim 7 wherein the annular flange is hexagonal.

10. An oil inlet adapter for an engine lubrication passage system comprising:

a bolt configuration, said bolt configuration comprising a first end having an externally threaded region, and a second end having a flange extending radially outwardly from the threaded region, said first end having a central bore extending internally therethrough forming a first passage, said first end fluidly communicating to the engine lubrication passage system, and said flange having a bore extending internally therethrough forming a second passage wherein said first passage fluidly communicates with said second passage for defining a single through passage; and means for fluidly connecting said second passage to an external oil supply source, wherein said first passage and said second passage form essentially a 90° angle therebetween.

11. The oil inlet adapter of claim 10 further including a means for maintaining oil flow in only one direction.

12. An oil inlet adapter for an engine lubrication passage system comprising:

a bolt configuration, said bolt configuration comprising a first end having an externally threaded region, and a second end having a flange extending radially outwardly from the threaded region, said first end having a central bore extending internally therethrough forming a first passage, said first end fluidly communicating to the engine lubrication passage system, and said flange having a bore extending internally therethrough forming a second passage wherein said first passage fluidly communicates with said second passage for defining a single through passage; and means for fluidly connecting said second passage to an external oil supply source, wherein said means for fluidly connecting said second passage to an external oil supply source comprises an extension nipple having a central inner bore providing an oil entry opening proximate to second passage.

* * * * *